R. WALKER.
Carriage-Springs.

No. 145,374.             Patented Dec. 9, 1873.

WITNESSES:      *Fig. 3.*      INVENTOR:

R. Walker

BY

ATTORNEYS.

UNITED STATES PATENT OFFICE.

ROBERT WALKER, OF HARRISVILLE, OHIO.

IMPROVEMENT IN CARRIAGE-SPRINGS.

Specification forming part of Letters Patent No. 145,374, dated December 9, 1873; application filed October 18, 1873.

*To all whom it may concern:*

Be it known that I, ROBERT WALKER, of Harrisville, in the county of Harrison and State of Ohio, have invented a new and useful Improvement in Springs, of which the following is a specification:

The invention will first be fully described and then pointed out in the claims.

Figure 1:
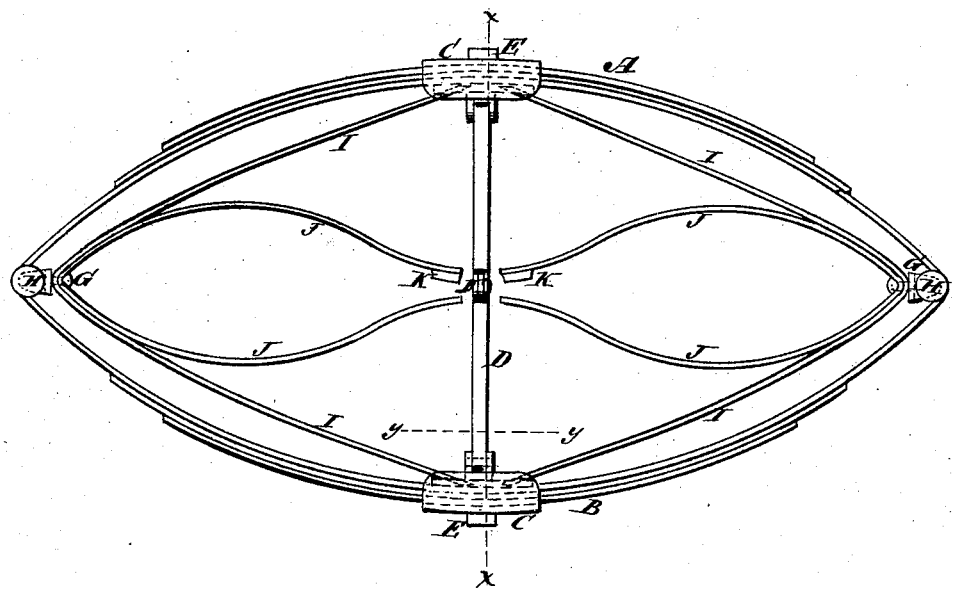
Figure 2:
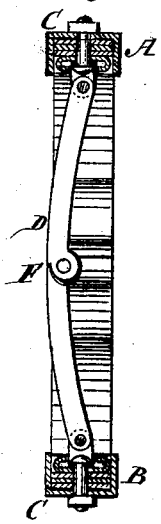
Figure 2:
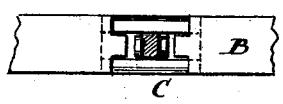

Figure 1 represents a side view of the springs, showing the arrangement of parts. Fig. 2 is a cross-section of Fig. 1 taken on the line $x\,x$; and Fig. 3 is a section of Fig. 1, looking down from the line $y\,y$.

Similar letters of reference indicate corresponding parts.

A and B are the upper and lower halves of an elliptic spring, of uniform size, composed of three, more or less, leaves. C C are flanged plates on the outside of these halves, the flanges of which project inward. D is a knee-joint stay, the ends of which are attached by joint-pins to the forked bolts E, which pass through the plates C, and through the halves A B, as seen in the drawing. F is the joint in the stay. As seen in Fig. 1, this joint forms the arc of a circle, which places the center of the joint F outside of a straight line drawn from one to the other of the joint-pins at the ends of the stay. When the spring is compressed the joint F gives, and when the spring reacts the stay limits the motion and prevents breakage. G G are clevises attached to the spring by the end bolts H H. I I are springs of angular form at the ends of the elliptic, confined to the clevises at their angles, with their ends resting on the plates C within the flanges. J J are springs of oval form, confined to the clevises the same as the springs I I, with their other ends separated and extending inward to near the stay D. K K are pads of rubber or other elastic material attached to the inside of one of the ends of each of these springs. When the elliptic is compressed, these ends are brought in contact with each other and the pads prevent noise.

These springs may be so arranged that, at ordinary pressures, they will not act, and so that they will not be brought into requisition except when the pressure is sufficient to jeopardize the safety of the elliptic, but they are designed to act as a safeguard at all times. These, with the springs I I, allow the elliptic to be made very light, and still be very strong and elastic.

Having thus described my invention, I claim as new and desire to secure by Letters Patent—

1. In combination with an elliptic spring the angular springs I I, substantially as and for the purposes described.
2. The flanged plates C C, and springs I I, combined as and for the purposes described.
3. The springs J J, in combination with an elliptic spring, as and for the purposes described.
4. The pads K K, on the springs J J, as and for the purposes set forth.

ROBERT WALKER.

Witnesses:
JOHN W. MORRIS,
EDWARD MORRIS, Jr.